US007292367B2

(12) United States Patent  
Kawahira

(10) Patent No.: US 7,292,367 B2  
(45) Date of Patent: Nov. 6, 2007

(54) IMAGE FORMING APPARATUS AND IMAGE FORMING METHOD

(75) Inventor: Akiko Kawahira, Toyama (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 10/893,432

(22) Filed: Jul. 19, 2004

(65) Prior Publication Data  
US 2004/0252342 A1 Dec. 16, 2004

Related U.S. Application Data

(62) Division of application No. 10/171,537, filed on Jun. 17, 2002, now Pat. No. 6,801,750.

(30) Foreign Application Priority Data

Jun. 25, 2001 (JP) ............................. 2001/191011

(51) Int. Cl.  
G06F 15/00 (2006.01)  
G03G 15/00 (2006.01)

(52) U.S. Cl. ...................... 358/1.18; 399/407; 399/408
(58) Field of Classification Search ............... 358/1.18, 358/1.15, 296, 1.2, 1.1, 304; 399/407, 410, 399/408; 270/58, 58.07, 58.08, 8; 355/72  
See application file for complete search history.

(56) References Cited

U.S. PATENT DOCUMENTS

| 4,592,651 | A | * | 6/1986 | Oikawa et al. ................ 355/72 |
| 4,727,402 | A | * | 2/1988 | Smith ......................... 399/368 |
| 5,177,548 | A | | 1/1993 | Nakamura et al. ........... 355/324 |
| 5,551,679 | A | | 9/1996 | Yoshida et al. ........... 270/58.09 |
| 5,717,843 | A | * | 2/1998 | Tabata et al. ............... 358/1.18 |
| 5,918,101 | A | | 6/1999 | Kuroyanagi ................. 399/407 |
| 6,417,931 | B2 | | 7/2002 | Mori et al. ................. 358/1.15 |
| 2002/0097407 | A1 | * | 7/2002 | Ryan et al. .................. 358/1.1 |

FOREIGN PATENT DOCUMENTS

| JP | 3-151286 | 6/1991 |
| JP | 8-32064 | 12/1996 |
| JP | 8-324064 | 12/1996 |
| JP | 9-261385 | 10/1997 |
| JP | 10-117282 | 5/1998 |

* cited by examiner

Primary Examiner—Madeleine A V Nguyen  
(74) Attorney, Agent, or Firm—Fitzpatrick, Cella, Harper & Scinto

(57) ABSTRACT

An image forming apparatus having: image forming means for visualizing image data read out by image reading means and forming it onto transfer materials; post-processing means for executing a post-process including a stapling process, a folding process, and/or a sorting process in order to execute a book-binding process to the transfer materials on which the image data has been formed; and a trimmer for executing a trimming process to a bundle of the transfer materials subjected to the binding process by the post-processing means, wherein when the trimming process by the trimmer is executed, the image forming means sets a non-image forming area including a processing portion to which the trimming process is executed and a valid image forming area excluding the non-image forming area onto the transfer material and forms the image data read out by the image reading means into the valid image forming area of the transfer material.

15 Claims, 13 Drawing Sheets

IMAGE FORMING APPARATUS AND IMAGE FORMING METHOD

CROSS-REFERENCE TO RELATED APPLICATION

This application is a divisional application of application Ser. No. 10/171,537, filed Jun. 17, 2002.

BACKGROUND OF THE INVENTION

1. Field of the Invention

The invention relates to an image forming apparatus or the like such as a copying apparatus or the like and, more particularly, to an image forming apparatus or the like to which a post-processing apparatus and a trimming apparatus are attached and which can execute a binding process.

2. Related Background Art

Hitherto, there has been known an image forming system in which, to an image forming apparatus for reading an image of an original and forming the read image onto a transfer material (paper), a post-processing apparatus for executing a binding process such as stapling process, folding process, sorting process, and the like to the paper on which the image has been formed and a trimming apparatus for executing a cutting process to the sheets of paper subjected to the binding process by the post-processing apparatus are attached.

By attaching such post-processing apparatus and trimming apparatus, not only the operations for the stapling, folding, sorting, and the like of the paper can be lightened but also the bound paper of higher quality can be obtained by cutting overflow portions of the folded and stacked paper obtained after completion of the binding process.

The above conventional image forming system, however, has a problem such that if the sheets of paper subjected to the binding process by the post-processing apparatus are further subjected to the cutting process by using the trimming apparatus, a distance between a paper edge of the paper in a paper bundle obtained after completion of the cutting process and an image forming area, that is, a width of blank portion differs every paper and is not constant, so that binding quality deteriorates.

SUMMARY OF THE INVENTION

In consideration of the above conventional problems, it is an object of the invention to provide an image forming apparatus or the like in which when image data to be subjected to a book-binding process is formed-onto paper, a width of blank portion does not differ every paper but can be set to be constant, and binding quality can be improved.

To accomplish the above object, according to the invention, there is provided an image forming apparatus comprising: image forming means for visualizing image data and forming it onto transfer materials; post-processing means for executing a post-process including a stapling process, a folding process, and/or a sorting process in order to execute a binding process to the transfer materials on which the image data has been formed; and a trimmer for executing a trimming process to a bundle of the transfer materials subjected to the binding process, wherein when the trimming process by the trimmer is executed, the image forming means sets a non-image forming area including a processing portion (that is, a portion to be processed) to which the trimming process is executed and a valid image forming area excluding the non-image forming area onto the transfer material and forms the visualized data onto the valid image forming area.

DETAILED DESCRIPTION OF THE PREFERRED EMBODIMENT

An embodiment of the invention will be described hereinbelow with reference to the drawings.

(Whole Construction)

Figure 1:
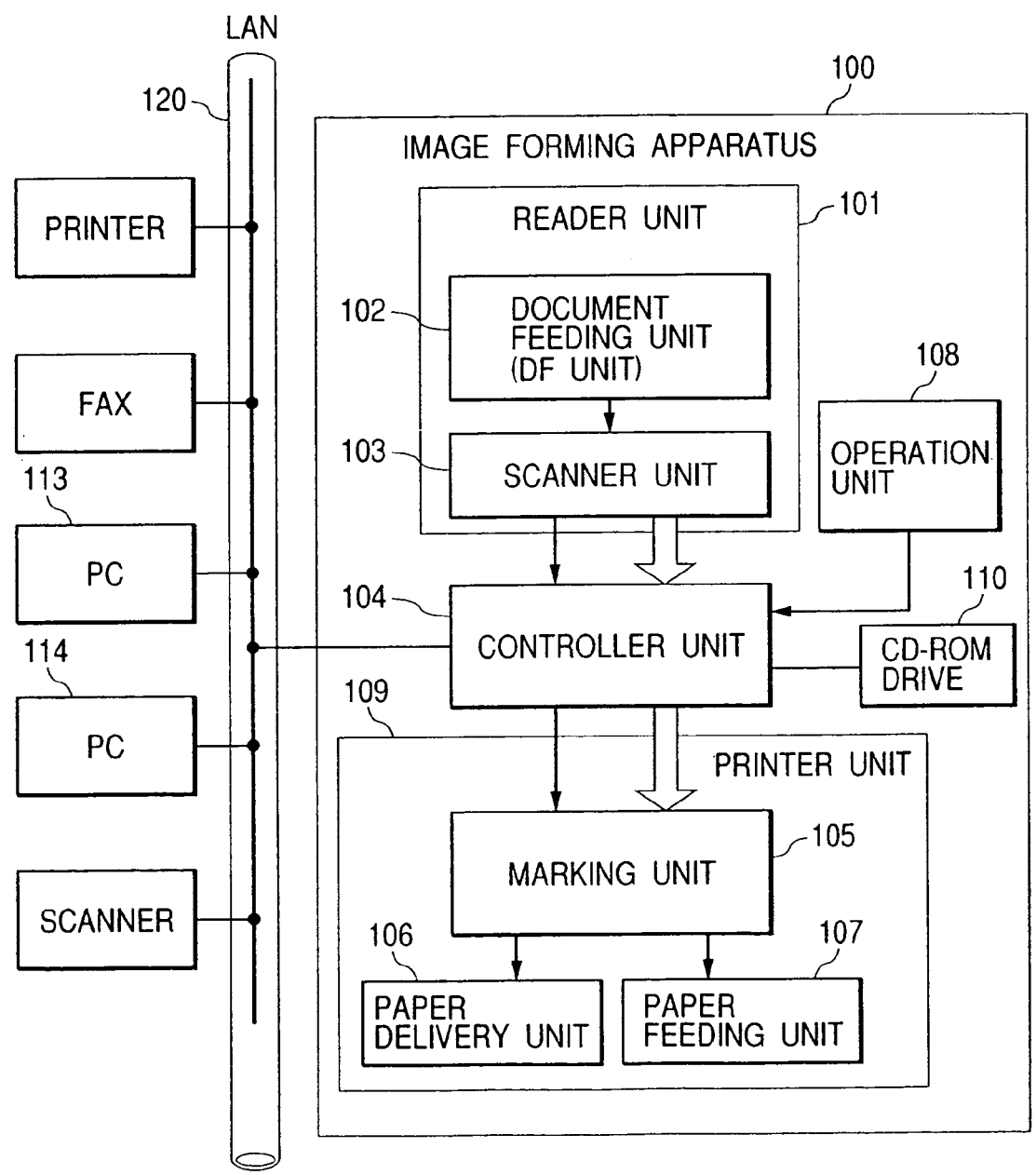
FIG. 1 is a block diagram showing a whole construction of an image forming apparatus according to an embodiment of the invention.

FIG. 1 is a block diagram showing a whole construction of an image forming apparatus according to the embodiment of the invention.

An image forming apparatus 100 is connected to a plurality of host computers (in the embodiment, first and second host computers 113 and 114) via a LAN (Local Area Network) 120 such as Ethernet (registered trademark) or the like.

That is, the image forming apparatus 100 is constructed by: a reader unit 101 for executing a reading process of image data; a printer unit 109 for executing an outputting process of the image data; an operation unit 108 having a keyboard for executing the input/output operation of the image data and a liquid crystal panel for executing a display of the image data and various functions, or the like; a CD-ROM drive 110 to which a CD-ROM in that a control program, the image data, and the like have previously been written is loaded and which executes a process for reading out contents stored in the CD-ROM; and a controller unit 104 comprising a single electronic part which is connected to each of those component elements and controls the component elements.

Further, the reader unit 101 has: a document feeding unit (DF unit) 102 for conveying original paper; and a scanner unit 103 for optically reading an image of the original and converting it into image data as an electric signal. The printer unit 109 has: a paper feeding unit 107 having a plurality of sheet feeding cassettes for enclosing recording paper; a marking unit 105 for transferring and fixing the image data onto the recording paper; and a paper delivery unit 106 for executing a sorting process or a stapling process to the printed recording paper and ejecting it to the outside.

(Document Feeding Unit)

Figure 2:
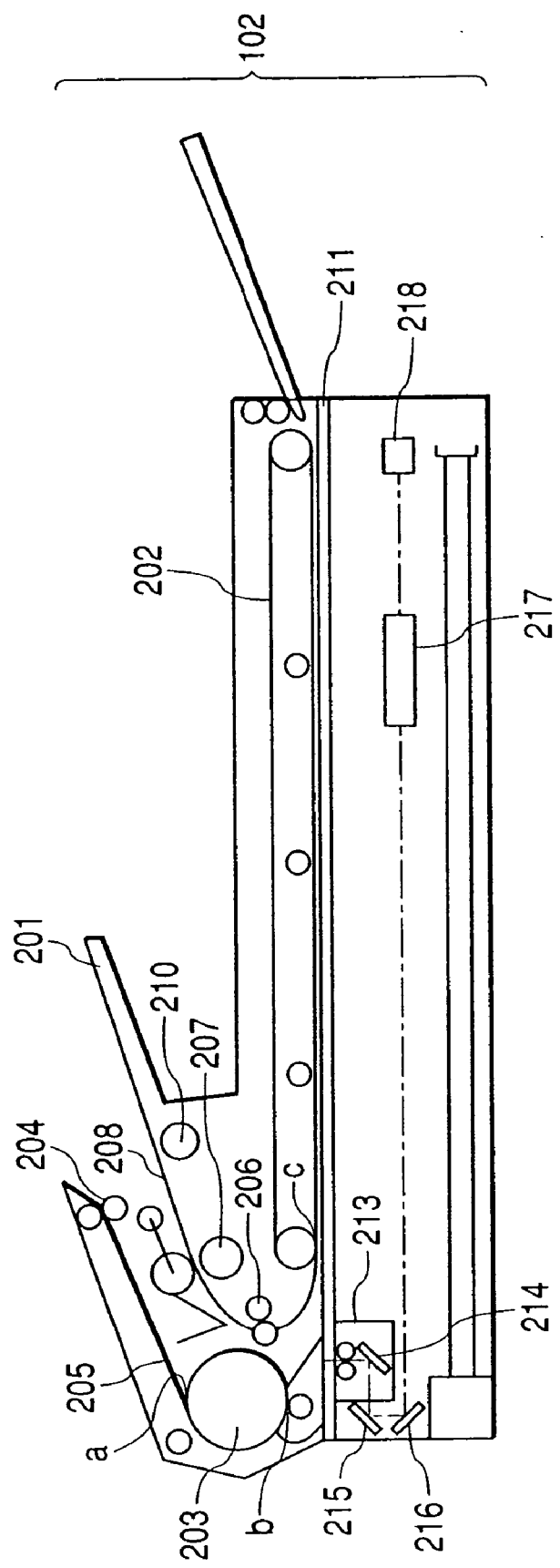
FIG. 2 is a cross-sectional view showing a detailed construction of a document feeding unit 102.

FIG. 2 is a cross sectional view showing a detailed construction of the document feeding unit 102.

As shown in the diagram, a stacking tray 201 as a first original tray for setting an original bundle has been attached to the document feeding unit 102. The stacking tray 201 is equipped with feeding means constructing a portion on one side of document feeding means. The feeding means is constructed by: a woodruff roller 210; a separation conveying roller 207; a separating motor SPRMTR (not shown); a resist roller 206; an overall belt 202; a belt motor BELMTR (not shown); a large conveying roller 203; a conveying motor FEEDMTR (not shown); a paper delivery roller 204; a flapper 205; a recycle lever 208; a paper feed sensor ENTS (not shown); a reversal sensor TRNS (not shown); a paper delivery sensor EFTS (not shown); and the like.

The woodruff roller 210 and conveying roller 207 are rotated by the action of the separating motor SPRMTR (not shown) and separate the originals one by one from the lowest portion of the original bundle on the stacking tray 201. The resist roller 206 and overall belt 202 are rotated by the action of the belt motor BELMTR (not shown) and convey the separated original to an exposing position on a platen glass surface 211 serving as a copyboard via sheet paths (a, b, c). Further, the large conveying roller 203 is rotated by the action of the conveying motor FEEDMTR (not shown) conveys the original on the platen glass surface 211 serving as a copyboard from the sheet path (c) to a sheet path (e) by bypassing. The original conveyed to the sheet path (e) is returned onto the original bundle on the stacking tray 201 by the paper delivery roller 204.

The recycle lever 208 detects one circulation of the original. At the start of the original feed, the recycle lever 208 is put onto the upper portion of the original bundle and the originals are sequentially fed. When a rear edge of the last original exits the recycle lever 208, it drops by its own weight. The recycle lever 208 detects one circulation of the original by the dropping operation.

When the original is conveyed onto the platen glass surface 211, a lamp 212 is lit on, the movement of an optical unit 213 is started, and the original is exposed and scanned. Reflected light from the original at this time is guided to a CCD image sensor (hereinafter, abbreviated to a CCD) 218 by mirrors 214, 215, and 216 and a lens 217. The image of the original which was scanned as mentioned above is read by the CCD 218. The image data which is outputted from the CCD 218 is subjected to predetermined processes and, thereafter, transferred to the controller unit 104.

In a manner similar to the original image, the read image is transferred to the controller unit 104 and recorded into a DRAM 38 via a scanner connector 56, a video I/F 55, and a scanner I/F 46. In this instance, usually, when the original is scanned, the image is binarized by the scanner I/F 46 or can be subjected to various image processes such as change in image density by an LUT, filtering process, and the like. However, in STEP 8101, as an image of a multivalue image (256 gradations), the image is stored into the DRAM as an image of 64 lines or more in the sub-scanning direction for the purpose of detecting dust.

In the controller unit 104, an average value in the sub-scanning direction of the image which has been read out before and recorded in the DRAM 38 is calculated by a CPU 33. Assuming that data of one line consists of, for example, 7000 pixels and the number of lines is equal to 64 lines, D(X,Y) is assumed to be pixel data.

When X denotes a coordinate in the line (sub-scanning) direction and Y indicates a coordinate in the main scanning direction, Line ⟨1⟩: $D(1, 1), D(1, 2), D(1, 3), D(1, 4), \ldots, D(1, 7000)$ Line ⟨2⟩: $D(2, 1), D(2, 2), D(2, 3), D(2, 4), \ldots, D(2, 7000)$ Line ⟨3⟩: $D(3, 1), D(3, 2), D(3, 3), D(3, 4), \ldots, D(3, 7000)$ Line ⟨4⟩: $D(4, 1), D(4, 2), D(4, 3), D(4, 4), \ldots, D(4, 7000)$ $\vdots$ Line ⟨64⟩: $D(64, 1), D(64, 2), D(64, 3), D(64, 4), \ldots, D(64, 7000)$ At this time, the average value in the sub-scanning direction is equal to $$Dii(x)=(D(1,x)+D(2,x)+D(3,x) \ldots +D(64,x))/64$$

An average value in the main scanning direction is calculated by the CPU 33 by using the obtained average value in the sub-scanning direction. Thus, an average density AVE of pixels in all lines which were read is calculated by the following equation.

$$AVE=Dii(1)+Dii(2)+Dii(3) \ldots +Dii(7000)/7000$$

A dust detection discriminating level is calculated by the CPU 33 on the basis of a discriminating reference which the user can designate. The discriminating reference which the user can designate is a value which is previously inputted by the user via a panel I/F 62. For example, it is now assumed that one of the levels 0 to 100 can be set as a multiplication ratio Z of the average value of the discriminating references. The value of Z is previously set by the user via the panel I/F 62. Since set contents of the value Z have been recorded in an EEPROM 66, the CPU 33 reads out the value Z via an input/output (I/O) control unit 51.

In the case as mentioned above, the discriminating level Judge is as follows.

$$\text{Judge}=AVE*Z/100$$

Upon detection of dirt, when the average value Dii(x) in the sub-scanning direction is Dii(x)>Judge, it is determined that there is dirt. The CPU 33 stores a discrimination result into the DRAM 38. Upon storage of a detection result of the dirt, the CPU 33 in the controller unit 104 reads out the detection result stored in the DRAM 38 and stores it into the EEPROM 66 via the I/O control unit 51. Since the EEPROM 66 is a non-volatile memory, the detection result is held even if a power source of the image forming apparatus 100 is turned off.

(Printer Unit)

Figure 3:
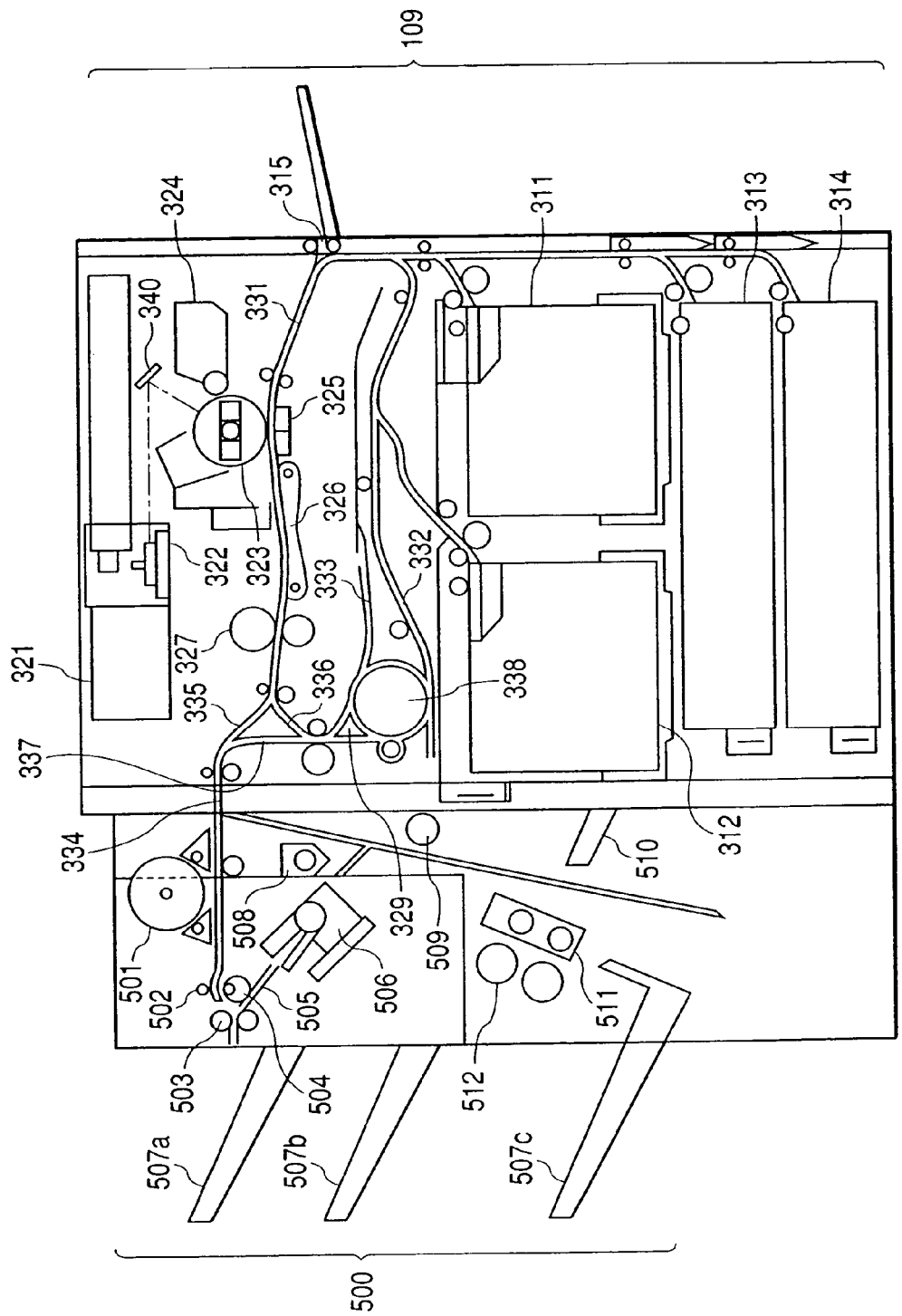
FIG. 3 is a cross-sectional view showing a detailed construction of a printer unit 109.

FIG. 3 is a cross-sectional view showing a detailed construction of the printer unit 109.

A laser driver 321 in the printer unit 109 drives a laser emitting unit 322 and allows the laser emitting unit 322 to emit a laser beam according to the image data outputted from the controller unit 104. The laser beam is irradiated onto a photosensitive drum 323. A latent image according to the laser beam is formed onto the photosensitive drum 323. A developing agent is adhered to the portion of the latent image on the photosensitive drum 323 by a developing unit 324.

The recording paper is fed at timing synchronized with the start of the irradiation of the laser beam by one of cassettes 311 to 314 and a manual paper feed stage 315 and conveyed to a transfer unit 325 along a conveying path 331. The developing agent adhered onto the photosensitive drum 323 is transferred onto the recording paper. The recording paper on which the developing agent has been adhered is conveyed to a fixing unit 327 by a conveying belt 326. The developing agent is fixed onto the recording paper by heat and pressure of the fixing unit 327.

After that, the recording paper which passed through the fixing unit 327 passes along conveying paths 335 and 334 and is ejected to the outside of the apparatus, or in case of reversing the printed surface and ejecting the paper, the recording paper is guided to conveying paths 336 and 338. From this position, the recording paper is conveyed in the opposite direction and passes along conveying paths 337 and 334.

If a duplex recording mode has been set, after the recording paper passed through the fixing unit 327, it is guided from the conveying path 336 to a conveying path 333 by a flapper 329. After that, the recording paper is conveyed in the opposite direction and guided to the conveying path 338 and a paper refeed conveying path 332 by the flapper 329. The recording paper guided to the paper refeed conveying path 332 passes along the conveying path 331 at the foregoing timing and is fed to the transfer unit 325.

The recording paper ejected from the conveying path 334 is conveyed to a finisher unit 500. First, the conveyed recording paper is sent to a buffer unit 501. Here, the conveyed recording paper is wound around a buffer roller and buffered in accordance with the necessity. For example, if it takes time to perform the stapling process or the like which is executed downstream, a conveying speed of the recording paper which is conveyed from the apparatus main body can be held constant by using the buffer unit. It can be made to be useful for improvement of a throughput.

After that, the recording paper is ejected onto a stacking tray 507a by an upstream ejection roller pair 502 and a downstream ejection roller pair 503.

In case of a stapling mode, the recording paper is conveyed by the upstream ejection roller pair 502, and just after a rear edge of the recording paper exits the position of the pair 502, the recording paper is returned by a knurled belt 504 and ejected onto a staple tray 505.

After the recording paper of a predetermined number are stacked and a stapling process is executed by a staple unit 506, they are ejected onto an ejecting tray 507a by the downstream ejection roller pair 503.

The ejecting tray has three bins of 507a to 507c. They can be moved vertically by a driving unit (not shown) in an interlocking relational manner.

Although FIG. 3 shows a state where the recording paper is ejected onto the ejection tray 507a, it is also possible to move the recording paper upward and eject it to the ejection tray 507b.

In the book-binding mode, the recording paper ejected from the conveying path 334 is sent to the inside of the apparatus until it reaches a position where its center portion is stapled by the staple unit 506. At this position, the recording paper is held. After a predetermined number of recording paper were stacked, the staple unit 506 is moved to a set position and each of the overlaid recording paper is stapled with a staple so as to obtain one bundle.

Subsequently, the stapled paper is conveyed by a conveying roller 509 so that its center portion is set to a folding position. An abutting member 510 is pushed out toward the recording paper bundle. While the recording paper bundle is folded at a predetermined position by the pushing operation of the abutting member 510, the bundle is pressed into a gap between a folding roller pair 511. The folding roller pair 511 sends the recording paper bundle by the feeding operation of the abutting member 510. By this operation, the recording paper bundle is folded in two and ejected from the folding roller pair 511. The twice-folded recording paper bundle is delivered onto the paper delivery tray 507c by a conveying roller 512.

(Trimming Apparatus)

Figure 4:
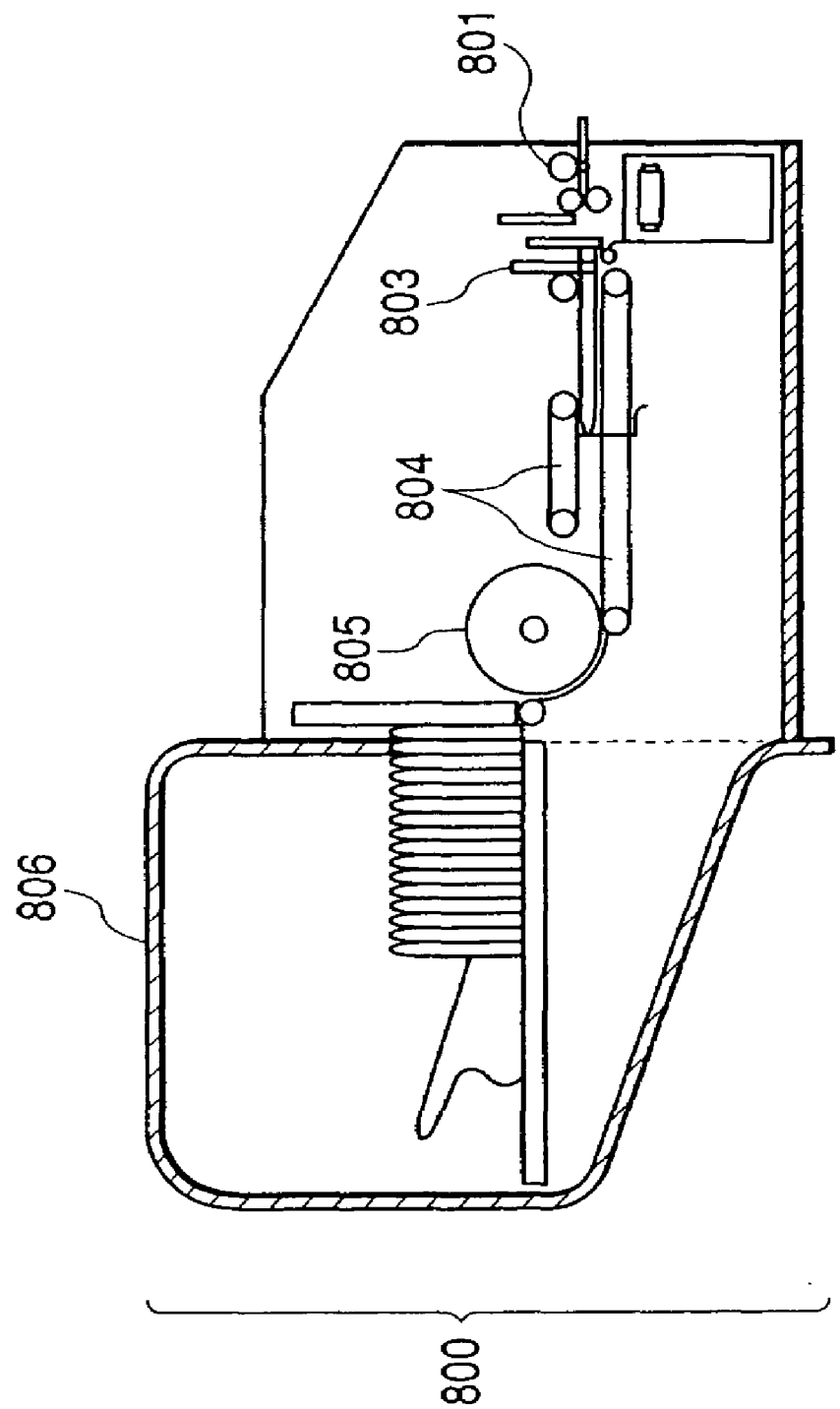
FIG. 4 is a cross-sectional view showing an internal construction of a trimming apparatus 800.

FIG. 4 is a cross-sectional view showing an internal construction of a trimming apparatus 800.

If the trimming apparatus 800 for executing a cutting process (trimming process) has been connected to the finisher unit 500, upon execution of the trimming process, the recording paper bundle conveyed from the inside of the finisher unit 500 by the conveying roller 512 is conveyed to a predetermined position between a conveying belt pair 804 by a conveying roller 801. An edge portion of the recording paper bundle is cut by a cutter blade 803. After that, the recording paper bundle is conveyed to a conveying roller 805 by the conveying belt pair 804 and, further, conveyed to an accumulating unit 806 by the conveying roller 805.

(Operation Unit)

Figure 5:
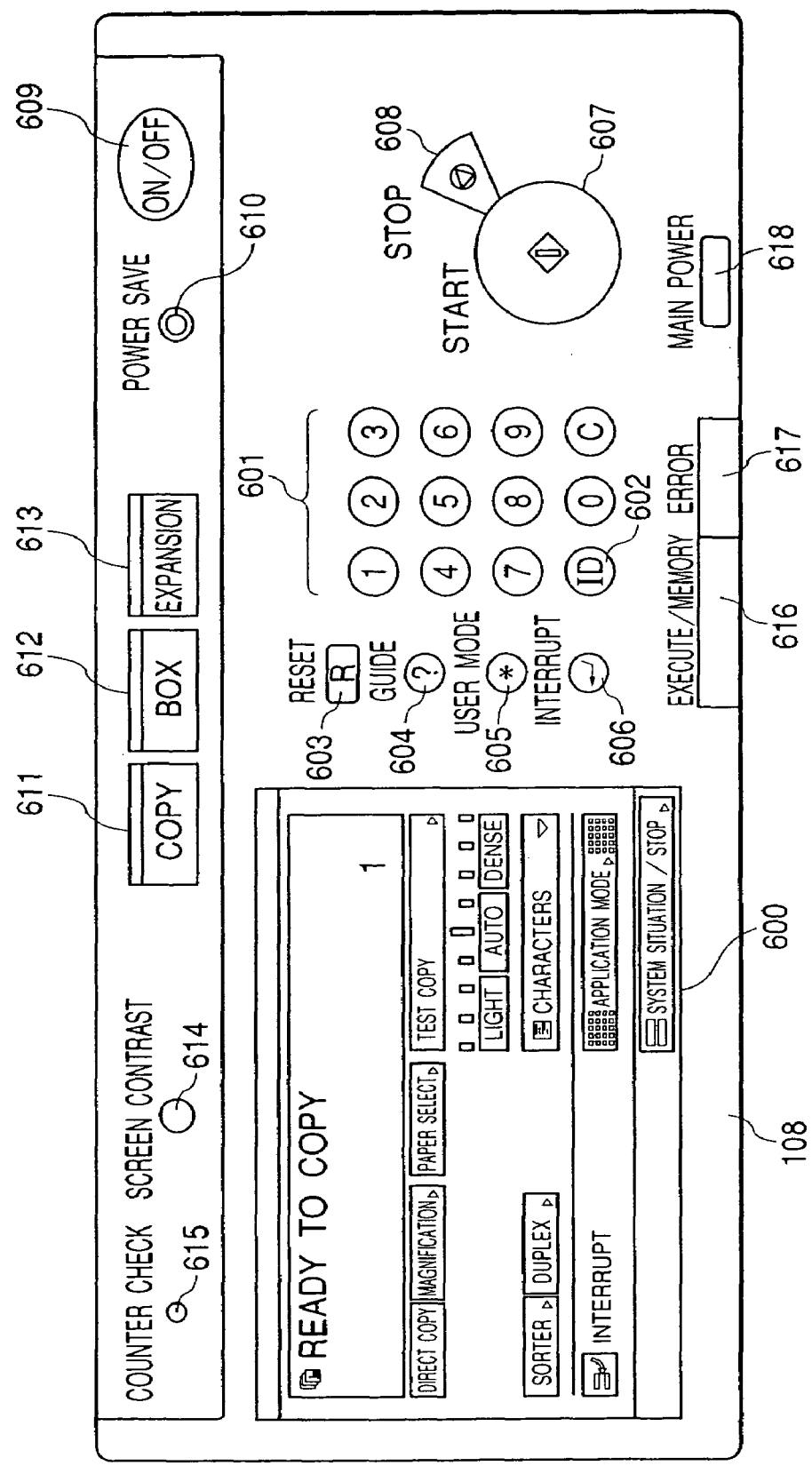
FIG. 5 is an external view showing a construction of an operation unit 108.

FIG. 5 is an external view showing a construction of the operation unit 108.

Reference numeral 600 denotes an LCD touch panel for performing a main mode setting and a situation display. Reference numeral 601 denotes a ten-key for inputting a numerical value of 0 to 9, and 602 indicates an ID key which is used for inputting a division number and a personal identification mode in the case where the apparatus is administrated every division.

Reference numeral 603 denotes a reset key for resetting the set mode; 604 a guide key for displaying an explanatory picture plane regarding each mode; 605 a user mode key for displaying a user mode picture plane; and 606 an interrupt key for executing an interruption copy.

Reference numeral 607 denotes a start key for starting the copying operation and 608 indicates a stop key for stopping a copy job which is being executed.

Reference numeral 609 denotes a soft power switch SW. By pressing this switch, a backlight of the LCD touch panel 600 is lit off and the apparatus enters a low electric power consumption mode. Reference numeral 610 denotes a power saving key. By pressing this key, the apparatus enters a power saving mode. By pressing it again, the apparatus is recovered to a normal mode from the power saving mode.

Reference numerals 611, 612, and 613 denote function keys for shifting the operating mode to a copy function, a box function, and an expanding function, respectively. In the example of FIG. 5, a default picture plane of the copy is displayed. By pressing the other function key 612 or 613, a default picture plane of each corresponding function is displayed.

Reference numeral 614 denotes an adjust key for adjusting contrast of the LCD touch panel and 615 indicates a counter check key. By pressing the key 615, a count picture plane for displaying the sum of the number of copies used so far is displayed on the LCD touch panel 600. Reference numeral 616 denotes an LED for showing a state where a job is being executed or the image data is being accumulated into an image memory; 617 an error LED for showing a state where the apparatus is in an error mode such as paper jam, door-open, or the like; and 618 a power LED showing a state where a main switch of the apparatus is ON.

(Controller Unit)

Figure 6:
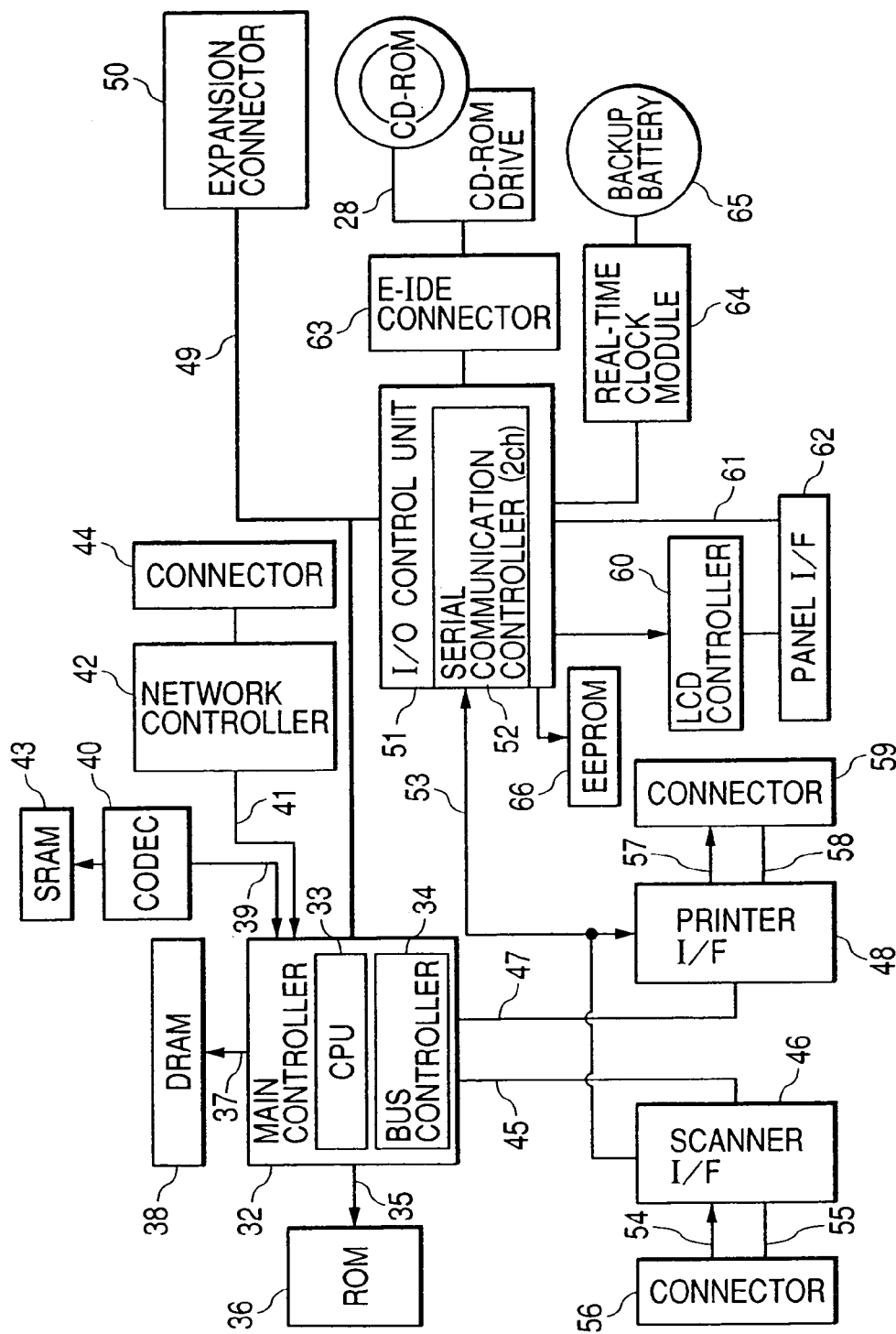
FIG. 6 is a block diagram showing details of a controller unit 104.

FIG. 6 is a block diagram showing details of the controller unit 104.

A main controller 32 has therein: the CPU 33; a bus controller 34; and a functional block including various controller circuits, which will be explained hereinlater. The main controller 32 is connected to a ROM 36 via a ROM I/F 35, further, connected to the DRAM 38 via a DRAM I/F 37, connected to a codec 40 via a codec-I/F 39, and connected to a network controller 42 via a network I/F 41.

Various control programs which are executed by the CPU 33 in the main controller 32 and arithmetic operation data have been stored in the ROM 36. The DRAM 38 is used as a work area for allowing the CPU 33 to operate or an area for accumulating the image data. The codec 40 compresses raster image data stored in the DRAM 38 by a well-known compression system such as MH, MR, MMR, JBIG, or the like and decompresses the compressed data into a raster image. An SRAM 43 is connected to the codec 40. The SRAM 43 is used as a temporary work area for the codec 40.

The network controller 42 executes a predetermined control operation between the network controller 42 and the LAN 120 via a connector 44. The main controller 32 is connected to the scanner I/F 46 via a scanner bus 45, connected to a printer I/F 48 via a printer bus 47, and further, connected to an expansion connector 50 for connecting an expansion board via a general high speed bus 49 such as a PCI bus or the like and to the input/output (I/O) control unit 51.

The I/O control unit 51 is equipped with asynchronous serial communication controllers 52 corresponding to two channels. Each of the asynchronous serial communication controllers 52 is provided for transmitting and receiving a control command to/from the reader unit 101 and printer unit 109. Each serial communication controller 52 is connected to the scanner I/F 46 and printer I/F 48 via an I/O bus 53.

The scanner I/F 46 is connected to the scanner connector 56 via a first asynchronous serial I/F 54 and the first video I/F 55. Further, the scanner connector 56 is connected to the scanner unit 103 in the reader unit 101. The scanner I/F 46 executes a desired binarizing process to the image data received from the scanner unit 103, executes a zooming process in the main scanning direction and/or the sub-scanning direction, forms a control signal on the basis of a video signal transmitted from the scanner unit 103, and transfers it to the main controller 32 via the scanner bus 45.

The printer I/F 48 is connected to a printer connector 59 via a second asynchronous serial I/F 57 and a second video I/F 58. Further, the printer connector 59 is connected to the marking unit 105 in the printer unit 109. The printer I/F 48 executes a smoothing process to the image data outputted from the main controller 32, outputs the processed image data to the marking unit 105, and further, outputs the control signal formed on the basis of the video signal sent from the marking unit 105 to the printer bus 47.

The CPU 33 operates on the basis of the control program read out from the ROM 36 via the ROM I/F 35 and, for example, interprets PDL (Page Description Language) data received from the first and second host computers 113 and 114, and develops them into raster image data.

The bus controller 34 controls transfer of data which is inputted and outputted to/from the scanner I/F 46, the printer I/F 48, or other external equipment connected to the expansion connector 50 or the like. The bus controller 34 controls arbitration upon bus competition or the transfer of DMA data. That is, for example, the data transfer between the DRAM 38 and codec 40 mentioned above, the data transfer from the scanner unit 103 to the DRAM 38, the data transfer from the DRAM 38 to the marking unit 105, and the like are controlled by the bus controller 34, and the data is DMA-transferred.

The I/O control unit 51 is connected to the panel I/F 62 via an LCD controller 60 and a key input I/F 61. The panel I/F 62 is connected to the operation unit 108. Further, the I/O control unit 51 is connected the EEPROM as a non-volatile memory via the expansion connector 50, connected to a CD-ROM drive 28 via an E-IDE connector 63, and further, connected to a real-time clock module 64 for updating/storing a date and time which are managed in the apparatus. The real-time clock module 64 is connected to a backup battery 65 and backed up by the backup battery 65.

(Details of Main Controller)

Figure 7:
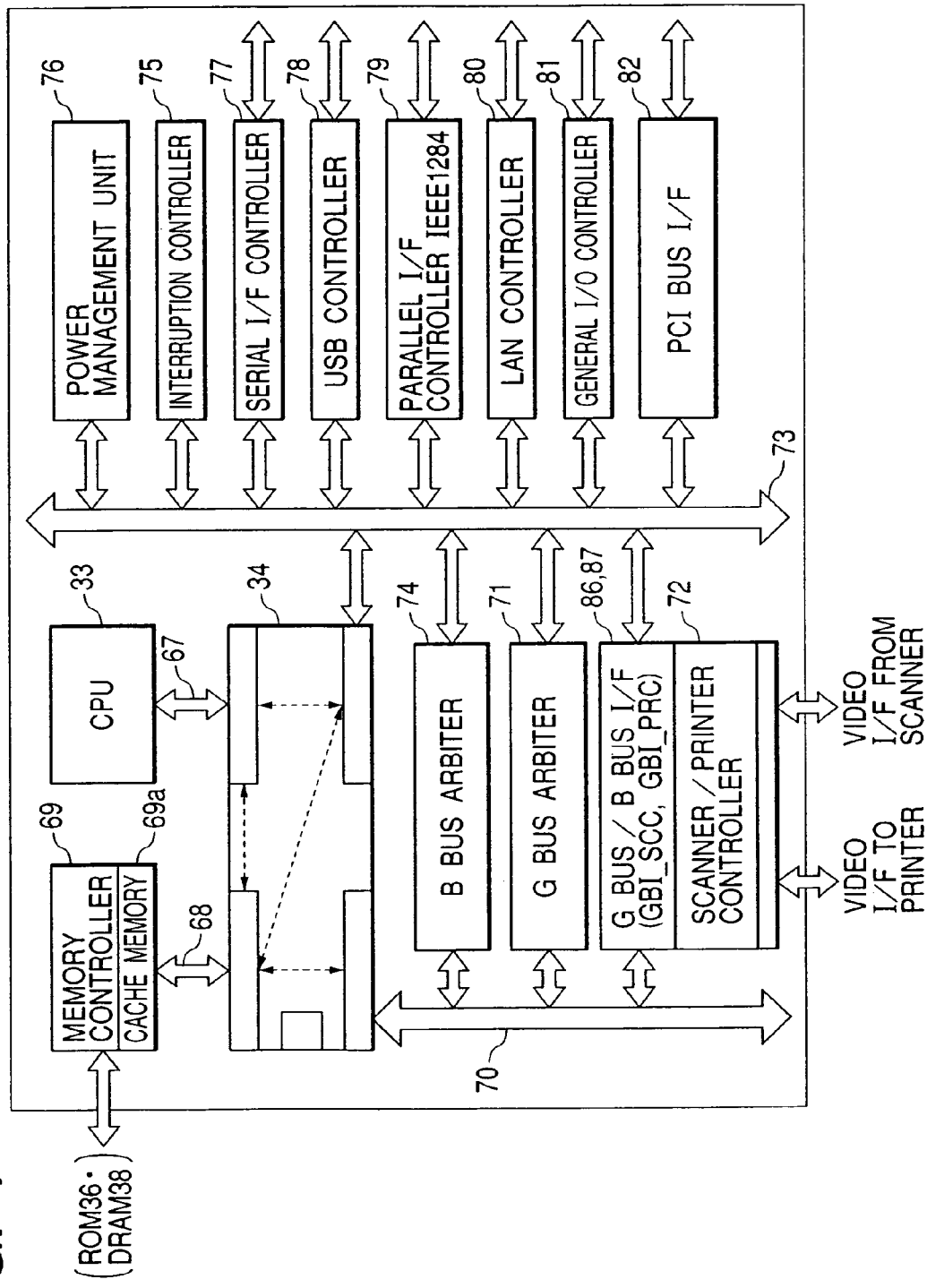
FIG. 7 is a block constructional diagram showing details of the inside of a main controller 32.

FIG. 7 is a block constructional diagram showing details of the inside of the main controller 32.

The bus controller 34 is constructed by a 64-bit cross bus switch of (4×4), connected to the CPU 33 via a processor bus (P bus) 67 of 64 bits, and connected to a memory controller 69 having a cache memory 69a via a local bus (M bus) 68 only for use of a memory. The memory controller 69 is connected to the memories such as ROM 36, DRAM 38, and the like and controls the operations of those memories.

The bus controller 34 is further connected to a G bus arbiter 71 and a scanner/printer controller 72 via a graphics bus (G bus) 70. The bus controller 34 is also connected to the following component elements via an input/output bus (B bus) 73. That is, it is connected to: a B bus arbiter 74; the G bus arbiter 71; an interruption controller 75; and various functional blocks (a power management unit 76, a serial I/F controller 77 such as UART or the like, a USB (Universal Serial Bus) controller 78, a parallel I/F controller 79 such as IEEE1284 or the like, a LAN controller 80 such as Ethernet (registered trademark) or the like, a general input/output controller 81 such as a timer or the like, a PCI bus I/F 82 for performing the I/F operation between the B bus 73 and a PCI bus serving as an external bus, and the scanner/printer controller 72).

The B bus arbiter 74 is arbitration for cooperation-controlling the B bus 73 and receives a bus use request of the B bus 73. After completion of the arbitration, use permission is given to one selected master, thereby inhibiting a situation such that two or more masters simultaneously access the bus. An arbitration system has priorities of three levels and a plurality of masters have been allocated to each priority.

The interruption controller 75 accumulates interrupting signals from the foregoing functional blocks and the outside of the controller unit 104 and distributes them again to the controllers 72 and 77 to 82 which are supported by the CPU 33 and to a non-maskable interrupt (NMI), respectively.

The power management unit 76 manages an electric power every functional block and, further, monitors an electric power consumption amount of the controller unit 104 as an electronic part constructed by one chip. That is, the controller unit 104 is constructed by a large scale ASIC (IC for a particular application) having the CPU 33 therein.

Therefore, if all of the functional blocks operate simultaneously, a large quantity of heat is generated and there is a fear that the controller unit 104 itself is broken.

To prevent such a situation, the electric power consumption is managed every functional block and the electric power consumption amount of each functional block is accumulated as a power management level into the power management unit 76. In the power management unit 76, the electric power consumption amount of each functional block is summed and the electric power consumption amount of each functional block is monitored in a lump so that the total electric power consumption amount does not exceed a limit electric power consumption.

The G bus arbiter 71 cooperatively controls the G bus 70 by a center arbitration system and has a dedicated request signal and a permission signal for each bus master. As a method of applying the priorities to the bus masters, either a fair arbitration mode in which all of the bus masters are set to the same priority and a bus right is fairly applied to them or a priority arbitration mode for allowing one of the bus masters to preferentially use the bus can be designated.

As shown in FIG. 6, in the scanner/printer controller 72, the scanner I/F 46 connected to the first video I/F 55 and the printer I/F 48 connected to the second video I/F 58 are connected via the I/O bus 53. Sync signals for horizontally and vertically synchronizing the image data which is transmitted from the reader unit 101 and the image data which is outputted from the printer unit 109 are directly coupled.

The scanner I/F 46 is connected to a first G bus/B bus·I/F unit 86. The printer I/F 48 is connected to a second G bus/B bus·I/F unit 87. That is, the scanner I/F 46 and printer I/F 48 are independently connected to the G bus 70 and B bus 73, respectively. The data transfer and reading and writing processes of registers are executed.

As mentioned above, the four buses (P bus 67, M bus 68, G bus 70, and B bus 73) are connected to the bus controller 34, thereby constructing the apparatus so that the simultaneous parallel connection can be assured as much as possible among those four buses. (Binding process showing a feature of the invention)

An image forming process which is executed when the binding process showing a feature of the invention is executed in the image forming apparatus having the construction as mentioned above will now be described.

First, an example of forming a book by reading 16 originals and forming the original images onto each of the obverse and reverse sides of four sheets of paper will be described.

Figure 8A:
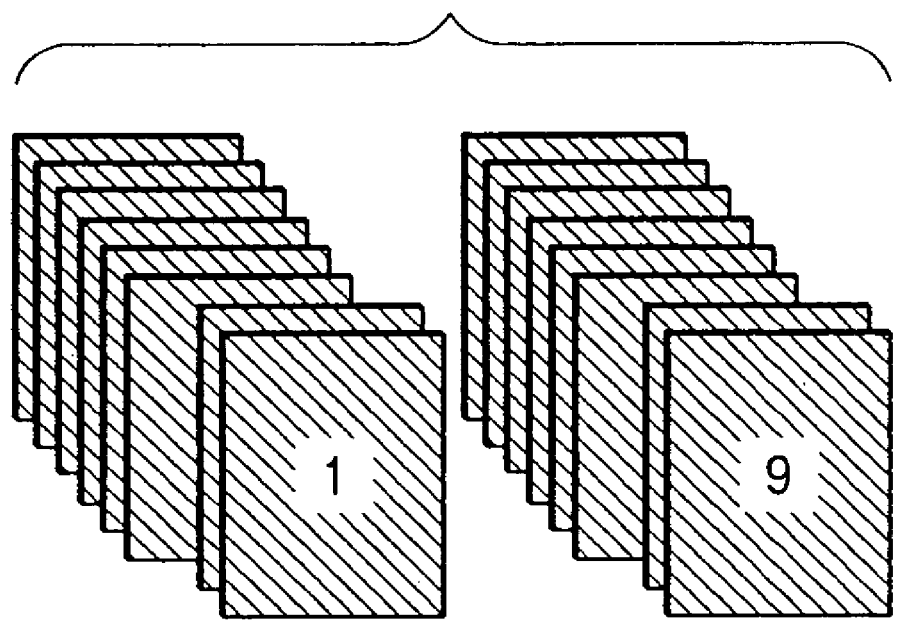
FIGS. 8A and 8B are diagrams showing specific examples of a binding process in the embodiment.

In the example, as shown in FIG. 8A, first, the original images of Nos. "1" to "16" are read and stored into the DRAM 38. Subsequently, as shown in FIGS. 9A to 9D, a layout of the original images is determined on the basis of a condition that a duplex printing mode of the printer unit 109 is set and an obverse paper delivery is executed.

Figure 9A:
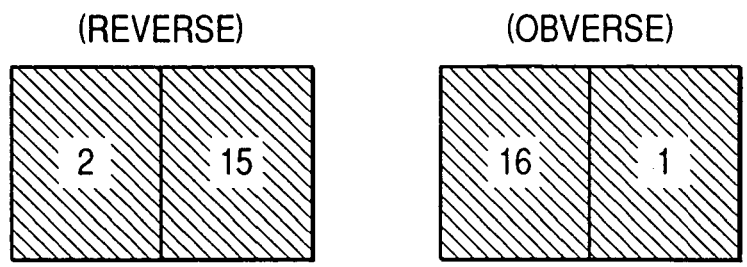
FIGS. 9A, 9B, 9C, and 9D are diagrams showing specific examples of the binding process in the embodiment.
Figure 9B:
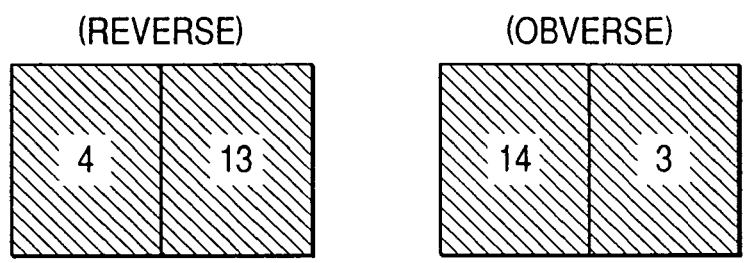

The original image of No. "10" locating at the intermediate page (the tenth page) is arranged on the left side of the obverse side of the first paper, and the original image of No. "7" locating at the intermediate page (the seventh page) is arranged on the right side of this paper. The original image of No. "8" locating at the intermediate page (the eighth page) is arranged on the left side of the reverse side (the surface on which the image is first formed in the duplex printing mode) of the first paper, and the original image of No. "9" locating at the intermediate page (the ninth page) is arranged on the right side of this paper (FIG. 9D).

Figure 9C:
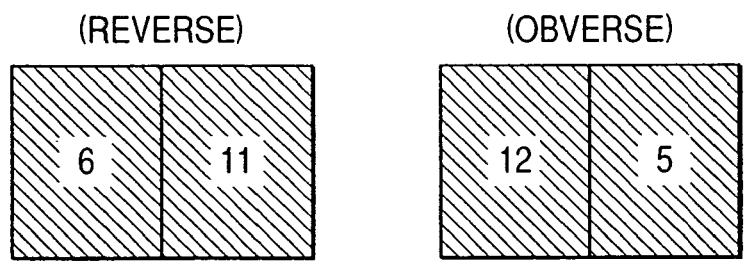
Figure 9D:
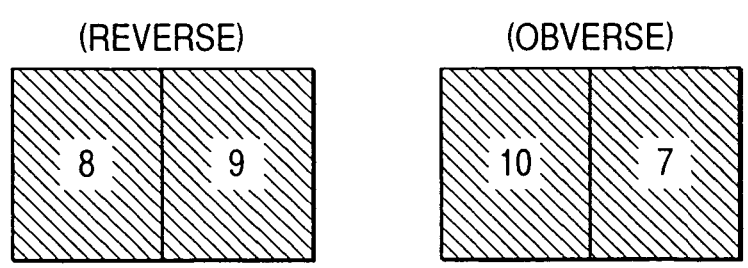

In a manner similar to the above, the original images of the obverse sides ("5", "12") and the reverse sides ("6", "11") are formed onto the second paper (FIG. 9C). The original images of the obverse sides ("3", "14") and the reverse sides ("4", "13") are also similarly formed onto the third paper (FIG. 9B). The original image of "16" locating at the last page (the sixteenth page) is arranged on the left side of the obverse side of the fourth paper, the original image of "1" locating at the head page (the first page) is arranged on the right side of the obverse side of this paper, the original image of "2" locating at the intermediate page (the second page) is arranged on the left side of the reverse side of this paper, and the original image of "15" locating at the intermediate page (the fifteenth page) is arranged on the right side of the reverse side of this paper, respectively (FIG. 9A).

The synthesis images of the original images arranged as mentioned above are formed in the print areas on the obverse and reverse sides of each paper. When the synthesis image is formed, a predetermined process such as a reducing process or the like is executed in accordance with a relation between a size of original image and the print area.

Figure 8B:
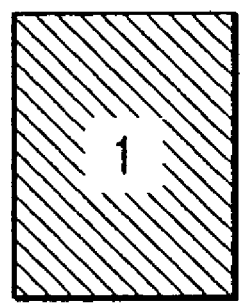

The processed synthesis image is sent to the printer unit 109 and formed on the paper. The sheets of paper are stapled to one bundle by the finisher unit 500 as shown in FIG. 8B and the center portion of the paper bundle is folded by a folding process, thereby forming a book of the recording paper.

Subsequently, a method of forming a non-image forming area upon setting of the cutting process (trimming process) will be described.

Figure 10:
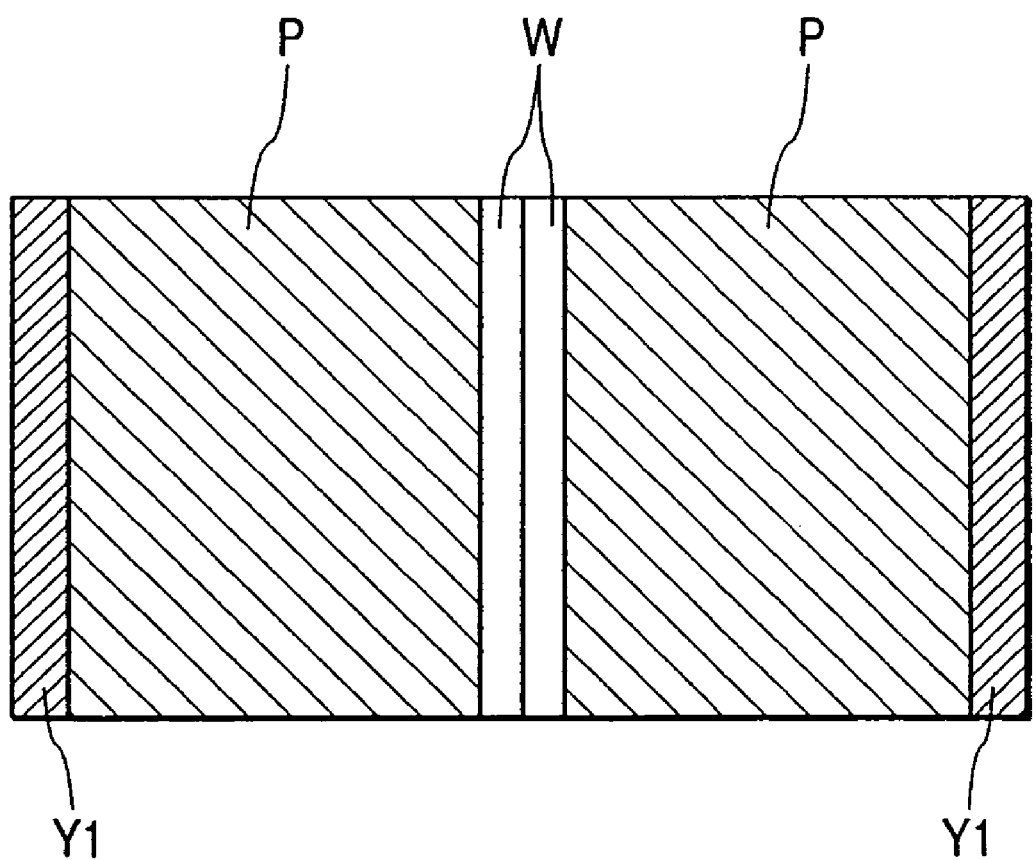
FIG. 10 is a diagram showing a specific example of the binding process in the embodiment.
Figure 11A:
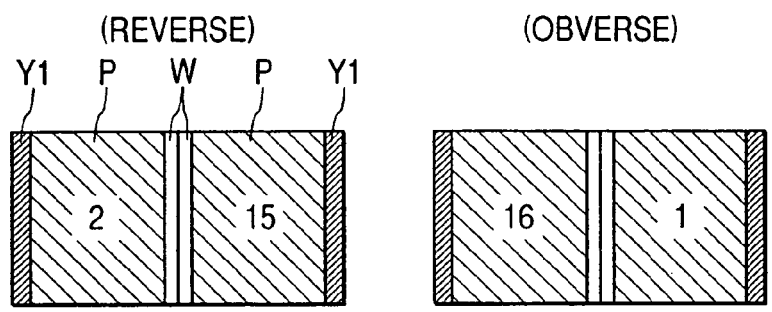
FIGS. 11A, 11B, 11C, and 11D are diagrams showing specific examples of the binding process in the embodiment.
Figure 11B:
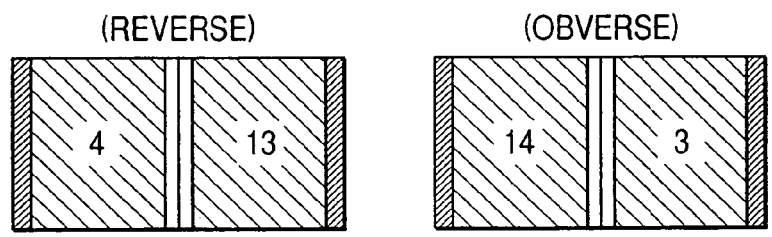
Figure 11C:
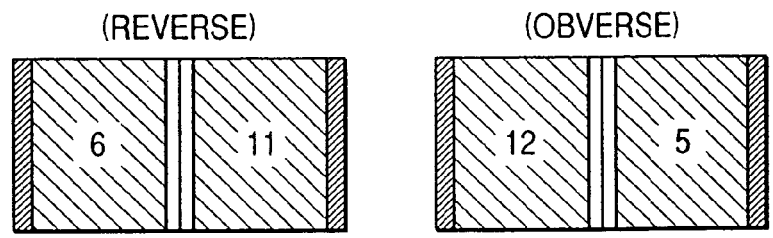
Figure 11D:
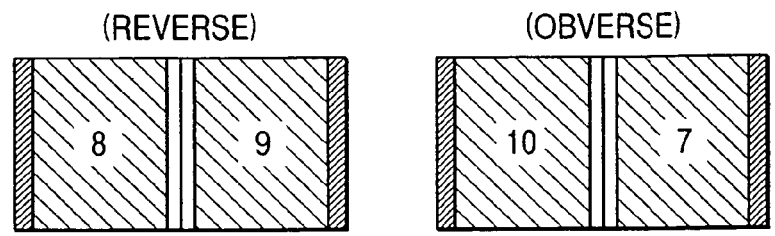
Figure 12A:
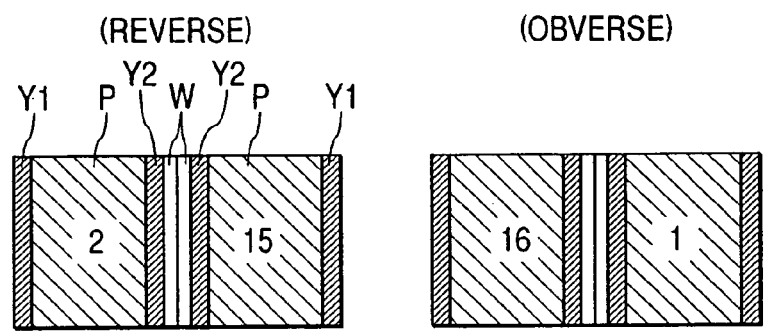
FIGS. 12A, 12B, 12C, and 12D are diagrams showing specific examples of the binding process in the embodiment.
Figure 12B:
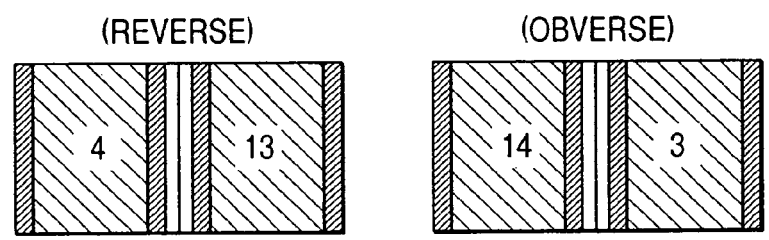
Figure 12C:
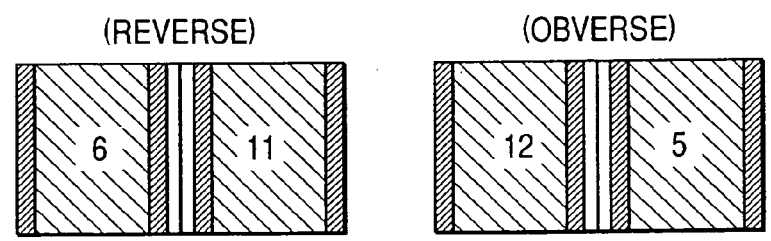
Figure 12D:
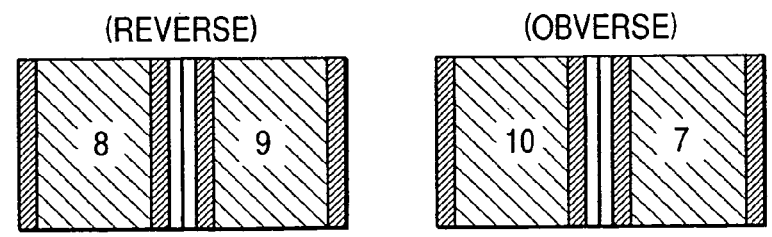

In case of executing the trimming process to the paper bundle formed as a book, in addition to the processing portion which is subjected to the process by a post-processing apparatus and a non-image forming area (W in FIG. 10) which is set when a center margin (to be stapled) is formed, non-image forming areas (Y1 in FIG. 10) which are subjected to the trimming process from the paper edges are added. As shown in FIGS. 11A to 11D, the non-image forming portions Y1 of the paper which is folded on the inner side when it is bound as a book become larger.

Therefore, since a size of image forming area P on the inner side and that on the outer side are different, as shown in FIGS. 12A to 12D, non-image forming areas Y2 are set for the inner side of the paper in accordance with the image forming areas (FIG. 12D) of the inside paper in which the image forming area P becomes minimum, and the non-image forming areas Y2 are set so that the image forming areas P of all sheets of paper are set to be constant.

As mentioned above, the non-image forming areas Y2 which are added upon setting of the trimming process are arranged from the center of the paper, so that a good book in which the image forming areas P of all sheets of paper are set to be constant and a width of region (a blank portion) in a range from the paper edge to the image forming area of each paper in the paper bundle obtained after the trimming process is constant can be obtained.

(Details of Image Forming Process)

Details of the image forming process at the time of the binding process in the embodiment will now be described with reference to a flowchart of FIG. 13.

Upon setting of the copying function, first, whether the operating mode is a book-binding mode for executing the binding process or not is discriminated in step S101. If the book-binding mode is not set, step S120 follows and a control regarding the normal copy output is made. In this example, there is executed a control such that the original is fed from the document feeding unit 102 and the original image read out from the fed original is outputted to the printer unit 109. In the printer unit 109 which received the original image, the original image is formed onto the recording paper, and the recording paper is ejected onto the bin of the finisher unit 500. After completion of the normal copy, the processing routine is finished.

On the other hand, if the book-binding mode has been set, step S102 follows and the reader unit 101 is instructed to read the original. The original reading process is executed to all originals and all of the read original images are stored into the DRAM 38. In next step S103, a layout order of the read-out images is determined.

Subsequently, in step S104, whether the image portion is erased or not is discriminated on the basis of conditions which are necessary for the binding process including the original size, paper size, the number of paper, and the like. For example, when the paper size is equal to the B5 size, since the binding process cannot be executed at this paper size, it is determined that the image portion is not erased. When the image portion is not erased as mentioned above, step S112 follows. The original images stored in the DRAM 38 in step S102 are synthesized in accordance with the layout of the original images determined in step S103, thereby forming a synthesis image on a paper unit basis and outputting it to the printer unit 109. The printer unit 109 which received the synthesis images forms the synthesis image data onto the paper and sends the paper to the finisher unit 500. The present processing routine is finished.

On the other hand, if it is determined in step S104 that the image portion is erased, step S105 follows and the print area excluding the non-print area is calculated for an image forming area of the paper. The image forming area of the paper denotes a printable area which has been predetermined by the apparatus on the basis of the size of paper. The non-print area is an area which includes at least a portion which is subjected to a post-process such as stapling process, folding process, or the like when the paper is folded into two to thereby form a book and in which the image creation is inhibited. The non-print area is also an area which has been predetermined in accordance with the original size, paper size, and the like. The non-print area can be changed by a user input from the operation unit 108.

The print area is an area in which the image creation is permitted and this area is obtained from the image forming area of the paper and the non-print area. For example, when the images on two originals of the A4 size (297 mm in the main scanning direction, 210 mm in the sub-scanning direction) are arranged onto the paper of the A3 size, a belt-shaped area having a width of 20 mm (10 mm+10 mm) and extending around the center portion of the paper as a center is set as a non-print area. The print area for each original image in this case is an area of 297 mm in the main scanning direction and 200 mm in the sub-scanning direction.

<The Case where Cutting Process (Trimming Process) is not Performed>

Subsequently, step S106 follows and whether the trimming mode for performing the trimming process to the recording paper bundle obtained after completion of the book-binding process has been set or not is discriminated. If it is determined that the trimming process is not executed, the processing routine advances to step S108.

In step S108, whether a relation "print area>original image area" is satisfied between the print area calculated in step S105 and the original image area which is formed on the paper or not is discriminated. If the relation "print area>original image area" is satisfied, step S109 follows.

Whether a mode to form a center margin (that is, center margin for stapling) has been set by an instruction input of the user from the operation unit 108 or not is discriminated.

If the mode to form the center margin has been set, step S110 follows. The image on the left side of the paper is shifted to the left edge side of the print area, a margin (that is, margin for stapling) is formed on the right side of the image, the image on the right side of the paper is shifted to the right edge side of the print area, and a margin is formed on the left side of the image, thereby forming a margin which extends with a predetermined width in the main scanning direction around the center portion of the paper as a center.

In step S111, an erasing range of the image portion is set. In this example, since the center margin was formed in step S110, this center margin is set to the non-print area which has been set as mentioned above. If the center margin is not formed, the non-print area which has been set in step S107 is legally set as a non-print area and the erasing range of the image portion is set on the basis of this non-print area.

In step S112, the original images stored in the DRAM 38 in step S102 are synthesized in accordance with the layout order of the original images set in step S103 as mentioned above, thereby forming a synthesis image on a paper unit basis and outputting this synthesis image to the printer unit 109. The present processing routine is finished.

Upon creation of the synthesis image, the synthesis image in which the image portion corresponding to the erasing range of the image portion set in step S111 has been erased is formed. The printer unit 109 which received the synthesis images forms the synthesis image data onto the paper and sends this paper to the finisher unit 500. The present processing routine is finished.

As mentioned above, if the trimming process is not performed, there is a case where a slight deviation occurs among the edges of the overlaid paper bundle or between the inner side and the outer side of the printed image.

If the relation "print area>original image area" is not satisfied in step S108, step S130 follows. Whether a mode to reduce the original image has been set by the user or not is discriminated. If the mode to reduce the original image is not set, step S131 follows. Whether a mode to shift the center has been set by the user or not is discriminated. If the mode to shift the center is not set, step S111 follows and the erasing range of the image portion is set. The foregoing preset non-print area is now set as a non-print area and the erasing range of the image portion is set on the basis of this non-print area.

Subsequently, the original images stored in the DRAM 38 in step S102 are synthesized in accordance with the layout order of the original images set in step S103, thereby forming a synthesis image on a paper unit basis. The synthesis images are outputted to the printer unit 109. The present processing routine is finished. Upon creation of the synthesis images, a synthesis image in which the image portion corresponding to the erasing range of the image portion set in step Sill has been erased is formed. The printer unit 109 which received the synthesis images forms the synthesis image data onto the paper and sends this paper to the finisher unit 500. The present processing routine is finished.

As mentioned above, if the reduction of the original image and the center shift are not performed under the condition that the relation "print area>original image area" is not satisfied, since the non-print area is set, a partial drop-out of the image occurs.

If it is determined in step S131 that the center shift has been set, step S132 follows and the center is shifted. The center shift denotes a process for shifting the center of the original image to the print area. The center shift is performed in the case where, for example, if the image area which the user does not want to erase is included in the non-print area, the image portion is shifted from the non-print area to the position of the print area.

If it is determined in step S130 that the image reduction has been set, step S140 follows. A reduction magnification at which the original image can be enclosed in the print area is calculated and the image is reduced on the basis of the calculated reduction magnification. In the foregoing example of arranging two original images of the A4 size onto the paper of the A3 size, since the magnification is equal to 297 mm/297 mm=100% in the main scanning direction and is equal to 200 mm/210 mm=95% in the sub-scanning direction, the magnification of 95% is set in both of the main scan and the sub-scan, and the image reduction is performed.

Subsequently, step S111 follows and the erasing range of the image portion is set. The preset non-print area is set as a non-print area and the erasing range of the image portion is set on the basis of the non-print area. Subsequently, the original images stored in the DRAM 38 in step S102 are synthesized in accordance with the layout order of the original images set in step S103, thereby forming a synthesis image on a paper unit basis. The synthesis images are outputted to the printer unit 109. The present processing routine is finished. Upon creation of the synthesis images, a synthesis image in which the image portion corresponding to the erasing range of the image portion set in step S111 has been erased is formed. The printer unit 109 which received the synthesis images forms the synthesis image data onto the paper and sends this paper to the finisher unit 500. The present processing routine is finished.

As mentioned above, if the original image is reduced under the condition that the relation "print area>original image area" is not satisfied, since the original image is reduced and can be enclosed in the print area, a partial drop-out of the image does not occur.

However, since the trimming process is not performed, there is a case where a slight deviation occurs among the edges of the overlaid paper bundle or between the inner side and the outer side of the printed image.

<The Case of Performing Cutting Process (Trimming Process)>

If it is decided in step S106 that the trimming process is executed, step S107 follows. The non-print areas from the paper edge are set every paper in order of FIGS. 9A to 9D in accordance with the layout order of the original images determined in step S103 in addition to the print area calculated in step S105. If the paper bundle was folded and overlaid, the paper of FIG. 9A is located on the outermost side and the sheets of paper are folded to the inner side in order of FIG. 9A to FIG. 9D.

When the trimming process is performed, a cutting width of paper in FIG. 9D corresponding to the innermost side becomes maximum and a cutting width of paper in FIG. 9A corresponding to the outermost side becomes minimum. Thus, the non-print area is set so that a distance between the paper edge after the cutting and the print area becomes constant. Therefore, as shown in FIGS. 11A to 11D, the print area P in the sub-scanning direction of the paper which is folded to the inner side becomes smaller. At this time, the width between the non-print area of the paper edge set by the paper which is folded to the innermost side in FIG. 11D and the non-print area (set in step S105) around the center portion of the paper as a center is set to the print area for the whole paper.

As mentioned above, the print area of the paper which is folded to the innermost side at the time of the binding process is set to a fundamental area, thereby determining the print areas of all sheets of paper which are bound to thereby form a book. That is, the non-print area around the center portion of the paper as a center set in step S105 with respect to the paper which is located on the outer side upon book-binding becomes larger.

In step S108, whether the relation "print area>original image area" is satisfied between the print area calculated in step S105 and the original image area which is formed on the paper or not is discriminated. If the relation "print area>original image area" is satisfied, step S109 follows. Whether the mode to form a center margin has been set by an instruction input of the user from the operation unit 108 or not is discriminated.

If the mode to form the center margin has been set, step S110 follows. The image on the left side of the paper is shifted to the left edge side of the print area, a margin is formed on the right side of the image, the image existing on the right side of the paper is shifted to the right edge side of the print area, and a margin is formed on the left side of the image, thereby forming the margin W which extends with a predetermined width in the main scanning direction around the center portion of the paper as a center as shown in FIGS. 11A to 11D.

In step S111, an erasing-range of the image portion is set. In this example, since the center margin W was formed in step S110, this center margin is set to the non-print area which has been set as mentioned above. If the center margin W is not formed, the non-print area which has been set in step S107 is set as a non-print area and the erasing range of the image portion is set on the basis of this non-print area.

In step S112, the original images stored in the DRAM 38 in step S102 are synthesized in accordance with the layout order of the original images set in step S103 as mentioned above, thereby forming a synthesis image on a paper unit basis and outputting this synthesis image to the printer unit 109. The present processing routine is finished. Upon creation of the synthesis image, the synthesis image in which the image portion corresponding to the erasing range of the image portion set in step S111 has been erased is formed.

The printer unit 109 which received the synthesis images forms the synthesis image onto the paper and sends this paper to the finisher unit 500. As mentioned above, in the finisher unit 500, the sheets of paper ejected from the printer unit 109 are sequentially fetched, the center portion of the paper bundle comprising a predetermined number of paper is stapled by the staple unit 506. The center portion of the stapled paper bundle is folded by the abutting member 510. The paper bundle passes through a gap between the folding roller pair 511 and is conveyed to the trimming apparatus 800. In the trimming apparatus 800 which received the bound paper bundle, the paper bundle is conveyed to a book-binding stopper and the trimming process is executed by the cutter blade 803. At this time, since the distance between the paper edge of the paper obtained after the cutting and the print area is corrected every paper, the widths of blank portions from the paper edges coincide after completion of the binding process.

As mentioned above, according to the embodiment, since a situation that the widths of blank portions differ depending on the paper is avoided, if the user sets the binding process and arbitrarily designates the mode to execute the trimming process, when the original images to be subjected to the book-binding process are formed on the paper by the image forming means, the non-image forming area to be formed onto the paper is set every page upon book-binding, so that the image creation adapted to correct the deviation of each page of the paper subjected to the book-binding process can be executed.

Figure 13:
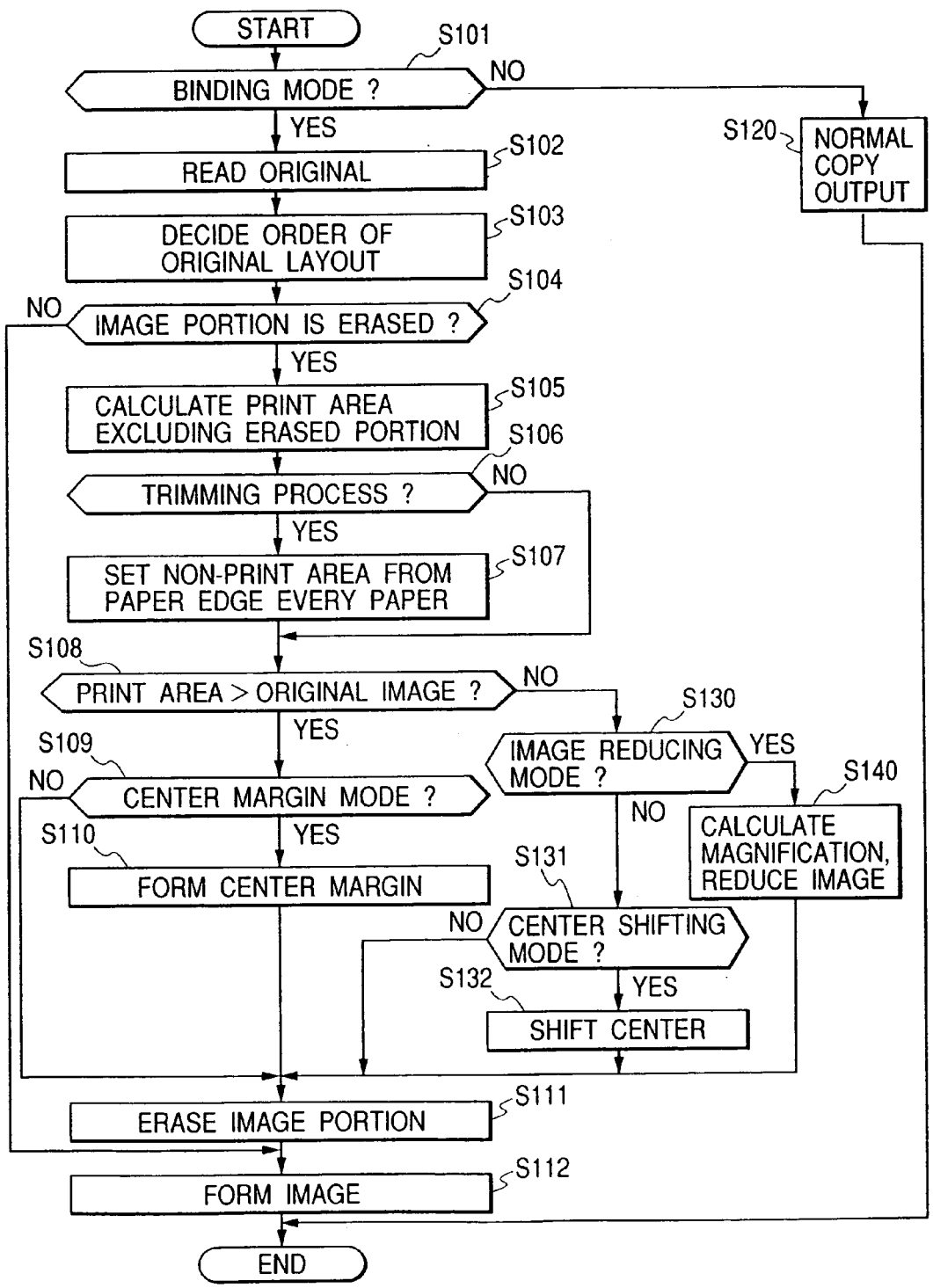
FIG. 13 is a flowchart showing an image forming process at the time of the binding process in the embodiment.

The foregoing control method can be realized by storing a program according to the flowchart of FIG. 13 mentioned above into the ROM 36 in the controller unit 104 and making the apparatus operative in accordance with this program.

The invention is not limited to the apparatus of the foregoing embodiment but can be also applied to a system comprising a plurality of apparatuses or an apparatus comprising one equipment. Naturally, the invention is also accomplished by a method whereby a memory medium in which program codes of the software for realizing the functions of the embodiment mentioned above have been stored is supplied to a system or an apparatus and a computer (or a CPU or an MPU) of the system or apparatus reads out the program codes stored in the memory medium and executes processes in accordance with the program codes.

In this case, the program codes themselves read out from the memory medium realize the functions of the embodiment mentioned above. The memory medium in which the program codes have been stored constructs the invention. As a memory medium for supplying the program codes, for example, a floppy (registered trademark) disk, a hard disk, an optical disk, a magnetooptic disk, a CD-ROM, a CD-R, a magnetic tape, a non-volatile memory card, or a ROM can be used. The invention incorporates not only a case where a computer executes the read-out program codes, so that the functions of the embodiment mentioned above are realized but also a case where an OS or the like which operates on the computer executes a part or all of the actual processes on the basis of instructions of the program codes and the functions of the embodiment mentioned above are realized by those processes.

Further, the invention also incorporates a case where the program codes read out from the memory medium are written into a memory equipped for a function expanding board inserted into a computer or a function expanding unit connected to a computer and, thereafter, a CPU or the like provided for the function expanding board or the function expanding unit executes a part or all of the actual processes on the basis of instructions of the program codes, and the functions of the embodiment mentioned above are accomplished by those processes.

As described in detail above, according to the invention, when the trimming process is executed by the trimmer, the non-image forming area including the processing portion which is subjected to the trimming process and the valid image forming area excluding the non-image forming area are set onto the transfer material, and the image data is formed into the valid image forming area on the transfer material. Therefore, when the image data to be bound to thereby form a book is formed onto the transfer material by the image forming-means, the widths of blank portions can be set to be constant without being different every transfer material. The valid image forming areas of all of the transfer materials can be also set to be constant. The book-binding quality can be improved.

What is claimed is:

1. A method for determining an arrangement location of a page data included in original page data to be printed on a bundle of recording materials including a first recording material and a second recording material to be folded by a folding unit, said method comprising the steps of:
performing a determining process that determines an arrangement location of a second page data on the second recording material, so that a distance from the arrangement location of the second page data on the second recording material to a folding position on the second recording material is different from a distance from an arrangement location of a first page data on the first recording material to a folding position on the first recording material;
performing a setting concerning whether the determining process is to be performed or is not to be performed as a printing condition of the original page data;
accepting a binding setting concerning a binding process of the bundle of recording materials and a trimming setting concerning a trimming process of the bundle of recording materials;
performing a setting so that the determining process is performed as a printing condition of the original page data in a case where a trimming setting is accepted; and
performing a setting so that the determining process is not performed as a printing condition of the original page data in a case where a trimming setting is not accepted.

2. A method according to claim 1, wherein performing a determining process that determines the arrangement location of the second page data on the second recording material, so that a distance from the arrangement location of the second page data on the second recording material to the folding position on the second recording material is narrower than a distance from the arrangement location of the first page data on the first recording material to the folding position on the first recording material.

3. A method according to claim 1, wherein determining an arrangement location of one page data included in the original page data, so that a distance between an arrangement location of the page data and an arrangement location of another page data on the same surface of a recording material is different from one recording material to another recording material.

4. A method according to claim 1, wherein the bundle of recording materials is folded in two so that the first recording material is located outside of the second recording material.

5. A method according to claim 1, wherein the setting is performed on the basis of instruction input via a user interface unit.

6. A controller for an image forming system for forming an image on a recording material of a bundle of recording materials to be folded by a folding unit, the bundle of recording materials including a first recording material and a second recording material, said controller comprising:
a unit that performs a determining process that determines an arrangement location of a second page data on the second recording material, so that a distance from the arrangement location of the second page data on the second recording material to a folding position of the second recording material is different from a distance from an arrangement location of a first page data on the first recording material to a folding position of the first recording material;
a unit that performs a setting concerning whether the determining process is to be performed or not to be performed as a printing condition of the original page data;
a unit that accepts a binding setting concerning a binding process of the bundle of recording materials and a trimming setting concerning a trimming process of the bundle of recording materials; and a unit that performs a setting so that the determining process is performed as a printing condition of the original page data in a case where a trimming setting is accepted and performs a setting so that the determining process is not performed as a printing condition of the original page data in a case where a trimming setting is not accepted.

7. A controller according to claim 6, wherein said unit that performs a determining process determines the arrangement location of the second page data on the second recording material, so that a distance from the arrangement location of the second page data on the second recording material to the folding position on the second recording material is narrower than a distance from an arrangement location of the first page data on the first recording material to the folding position on the first recording material.

8. A controller according to claim 6, wherein said controller that determines arrangement locations of a page data included in original page data, so that a distance between an arrangement location of a page data and an arrangement location of another page data on a same surface of a recording material is different from one recording material to another recording material.

9. A controller according to claim 6, wherein the bundle of recording materials is folded in two so that the first recording material is located outside of the second recording material.

10. A controller according to claim 6, wherein said setting is performed on the basis of instruction input via a user interface unit.

11. A computer-readable medium storing a computer-executable program for determining an arrangement location of a page data included in original page data needed for printing to a recording material of a bundle of recording materials including a first recording material and a second recording material to be folded by a folding unit, said medium storing a computer-executable program comprising code for causing a programmable computer to execute the steps of:

performing a determining process that determines an arrangement location of a second page data on the second recording material, so that a distance from the arrangement location of a second page data on the second recording material to a folding position on the second recording material is different from a distance from an arrangement location of a first page data on the first recording material to a folding position on the first recording material;

performing a setting concerning whether the determining process is to be performed or is not to be performed as a printing condition of the original page data;

accepting a binding setting concerning a binding process of the bundle of recording materials and a trimming setting concerning a trimming process of the bundle of recording materials;

performing a setting so that the determining process is performed as a printing condition of the original page data in a case where a trimming setting is accepted; and performing a setting so that the determining process is not performed as a printing condition of the original page data in a case where a trimming setting is not accepted.

12. A computer-readable medium according to claim 11, wherein said computer-executable program further comprises code to execute a step of performing a determining process that determines the arrangement location of the second page data on the second recording material, so that a distance from the arrangement location of the second page data on the second recording material to the folding position on the second recording material is narrower than a distance from the arrangement location of the first page data on the first recording material to the folding position on the first recording material.

13. A computer-readable medium according to claim 11, wherein said computer-executable program further comprises code to execute a step of determining an arrangement location of one page data included in original page data, so that a distance between an arrangement location of the one page data and an arrangement location of another page data on a same surface of a recording material is different from one recording material to another recording material.

14. A computer-readable medium according to claim 11, wherein the bundle of recording materials is folded in two so that the first recording material is located outside of the second recording material.

15. A computer-readable medium according to claim 11, wherein the setting is performed on the basis of instruction input via a user interface unit.

* * * * *

UNITED STATES PATENT AND TRADEMARK OFFICE
CERTIFICATE OF CORRECTION

PATENT NO. : 7,292,367 B2
APPLICATION NO. : 10/893432
DATED : November 6, 2007
INVENTOR(S) : Akiko Kawahira It is certified that error appears in the above-identified patent and that said Letters Patent is hereby corrected as shown below:

ON THE TITLE PAGE:
At Item (56), References Cited, Foreign Patent Documents, "JP   8-32064   12/1996" should be deleted.

Signed and Sealed this

Nineteenth Day of August, 2008

JON W. DUDAS
*Director of the United States Patent and Trademark Office*